Figure 1:
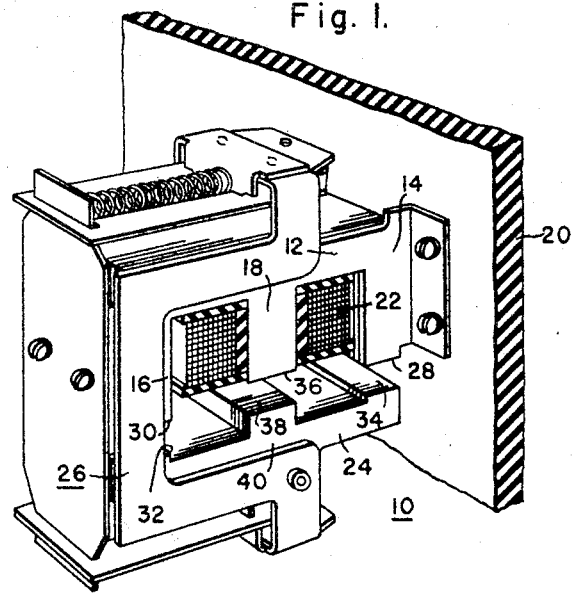

Aug. 22, 1961    J. D. ELLIS ET AL    2,997,633
ELECTROMAGNETIC ACTUATED DEVICES
Filed May 13, 1958

WITNESSES
Charles L. Board
Wm. B. Sellers.

INVENTORS
John D. Ellis and
Kurt A. Grunert.
BY
Frederick Stupor
ATTORNEY

# United States Patent Office 2,997,633
Patented Aug. 22, 1961

2,997,633
ELECTROMAGNETIC ACTUATED DEVICES
John D. Ellis, Brighton Township, Beaver County, and Kurt A. Grunert, Beaver, Pa., assignors to Westinghouse Electric Corporation, East Pittsburgh, Pa., a corporation of Pennsylvania
Filed May 13, 1958, Ser. No. 735,019
11 Claims. (Cl. 317—165)

This invention relates to electromagnetic actuated devices and particularly to magnetic core members employed in said devices.

In electromagnetic actuated devices such as relays, contactors, solenoids and the like, relatively movable magnetic core members having faces adapted to come in contact with and to mate with one another are employed. The contacting faces are often referred to in the art as pole faces. When the pole faces are in contact with each other during operation, a small air gap is usually maintained in the magnetic circuit or closed loop of the magnetic core members to provide for efficient and proper operation of the device.

Heretofore, the wear characteristics of the surfaces of the pole faces have been such that, after several million operations, the air gap progressively decreases causing the members to magnetically stick together and thereby preventing efficient and effective operation of the magnetic actuator.

The object of this invention is to provide in a magnetic actuator relatively movable magnetic core members having contacting faces and comprising laminations or sintered bodies of magnetic material, the magnetic core members being treated so as to provide contacting faces thereon that are capable of withstanding a great number of contacting operations without substantial loss of air gap therebetween.

A further object of this invention is to provide in a magnetic actuator relatively movable magnetic core members having contacting faces and comprising laminations or sintered bodies of magnetic material comprising a silicon-iron alloy, with or without aluminum, the contacting faces of said magnetic core members comprising a hard case produced by carbonitriding whereby the contacting faces will withstand a great number of contacting operations without substantial loss of air gap therebetween.

Another object of this invention is to provide in a magnetic actuator relatively movable magnetic core members having contacting faces and comprising laminations or sintered bodies of magnetic material, the contacting faces of said magnetic core members being provided with a relatively thin film of a light petroleum or mineral oil whereby the contacting faces will withstand a great number of contacting operations without substantial loss of air gap therebetween.

A still further object of this invention is to provide in a magnetic actuator relatively movable magnetic core members having contacting faces and comprising laminations or sintered bodies of magnetic sheet material comprising a silicon-iron alloy, with or without aluminum, the contacting faces of said magnetic core members comprising a hard case produced by carbonitriding and the surface of the case being provided with a relatively thin coating of a light petroleum or mineral oil whereby the contacting faces will withstand a great number of contacting operations without substantial loss of air gap therebetween.

Figure 2:
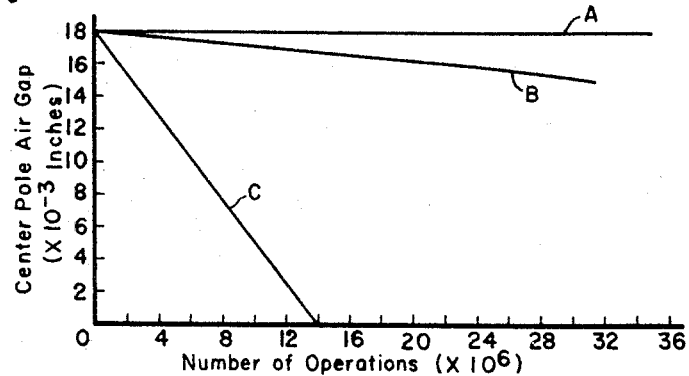
Figure 3:
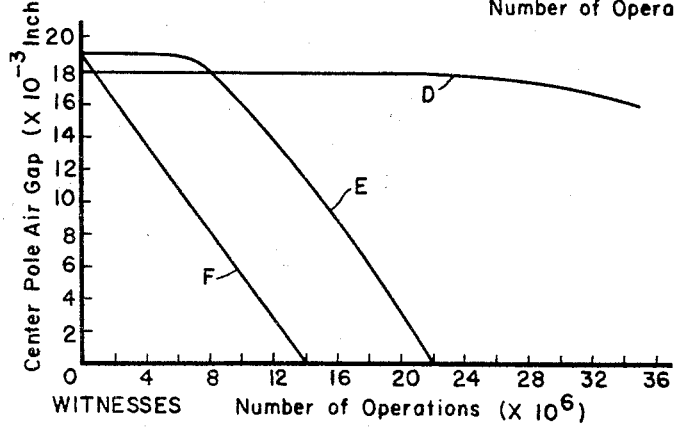

Other objects of this invention will in part be obvious and will in part appear hereinafter. For a better understanding of the nature and objects of this invention, reference should be had to the following detailed description and drawing, in which:

FIGURE 1 is a perspective view of an electromagnetic actuator;
FIG. 2 is a graph plotting air gap against a number of operations of a magnetic actuator; and
FIG. 3 is a graph plotting air gap against a number of operations of a magnetic actuator.

Referring to FIG. 1 of the drawing, there is shown a conventional type of electromagnetic actuating assembly 10 for operating a switch (not shown). An E-shaped laminated magnet member 12 comprising legs 14, 16 and 18 is mounted on a base member 20. The middle leg, or core, 18 carries an energizing coil 22, which when energized causes laminated armature member 24, which is movably mounted on an operator frame assembly 26, to move into closed position with magnet member 12. As a result of the movement of the armature, electrical contact members (not shown) mounted on the frame assembly are moved into contact with stationary electrical contact members (not shown), which, in turn, operates a motor or other electrical device.

When the magnet member 12 and armature member 24 are in closed relation with one another, contact faces 28 of leg 14, and 30 of leg 16 of magnet member 12 and contact faces 32 and 34 of the armature member 24 are in direct contact with and mated with one another. As is well known, the face 34 snaps into forceful contact with face 28 during each energization of coil 22, and similarly face 32 snaps against face 30. For effective and efficient operation of the electromagnetic actuator it is important that a predetermined air gap be maintained between face 36 of the middle leg 18 of magnetic member 12 and the face 38 of the center projection portion 40 of armature member 24, while contact faces 28, 30, 32 and 34 remain in contact. The characteristics of conventional materials for legs 14, 16 and armature 24 are such that after a moderate number of operations involving pole face impact, for example, 7,000,000 to 10,000,000, the faces 28, 34, 3 and 32 wear, pound down or otherwise give so that the air gap between 36 and 38 reaches zero, and the relay or contact device will not operate satisfactorily. The residual magnetic characteristics of the pole faces are such that at zero gap the armature member and the magnet member do not pull away from each other satisfactorily.

In accordance with this invention, it has been found that the number of contacting operations to which magnetic core members can be subjected without substantial change of air gap therebetween can be greatly increased, thereby greatly prolonging the useful life of a magnetic actuator.

Magnetic core members comprising laminations of magnetic sheet material or cores of sintered powdered magnetic materials are usually employed in electromagnetically actuated devices. The magnetic sheet material will normally comprise an alloy of from about 0.5% to 7% silicon and the balance iron, except for minor components and incidental impurities. In the silicon-iron alloys, minor components may include, for example, small amounts of up to 0.5% of manganese to improve the hot working characteristics of the alloy and small amounts of up to 2% aluminum to improve the magnetic characteristics of the alloy. Incidental impurities may comprise small amounts of carbon, sulfur, phosphorus and the like. Aluminum-iron alloys comprising up to about 10% by weight of aluminum and the balance iron except for minor components and incidental impurities may also be employed as magnetic materials in this invention.

In accordance with this invention the contacting faces of the magnetic core members are subjected to a carbonitriding treatment to provide on the contacting faces or pole faces a carbonitrided case of substantial depth. Cases at the pole faces of a thickness of from about 1 mil to 40 mils have proved to be satisfactory for the purposes of this invention. The case produced in this manner provides for a prolonged useful life of the contact device.

Further, in accordance with this invention, it has been determined that by treating the magnetic core members so as to provide on the surfaces of the contacting faces, a thin film of certain light hydrocarbon liquids or mineral oils, the useful life of the contact device can be extended. This thin film of oil can also be applied to the carbonitrided case produced by the carbonitriding treatment and still further extend the useful life of the contact device so that the utmost life can be obtained. This oil treatment will be more fully detailed hereinafter.

After the laminations have been assembled into an armature member and magnetic core member such as shown in FIG. 1 of the drawing, they are treated in an oxidizing atmosphere composed of a mixture of water vapor with up to about 90% by volume of carbon dioxide at a temperature of from about 750° F. to 1060° F. for a period of time of from about 1 hour to 6 hours. Reference is hereby made to U.S. Patent 2,543,710 assigned to the assignee of the present invention for a detailed description of this process. A relatively thin black oxide insulating film is produced by this process on the surfaces of the individual sheets comprising the laminations. After the oxidizing treatment, the pole faces are ground to remove the oxide film from these surfaces and to provide accurate mating surfaces thereon.

The black oxide film performs a three-fold function. It provides the members with interlaminar insulation, assists in retaining the oil in the members after saturation thereof and prevents any substantial degree of carbonitriding at these areas. The carbonitriding treatment is thus confined to the ground exposed pole faces.

The process of carbonitriding is known in the art and may be defined as the case hardening of a ferrous alloy member by the simultaneous absorption of carbon and nitrogen at elevated temperatures from a gas carburizing atmosphere that contains ammonia gas in controlled percentages. The nitrogen absorbed by the steel serves to lower the critical cooling rate of the case. If there is any aluminum present in the alloy, the nitrogen of the ammonia gas will react with the aluminum and produce hard aluminum nitrides and as such will contribute to the surface hardness of the contacting faces.

Briefly, the process comprises heating the member to be case hardened in a suitable furnace in the presence of a gaseous atmosphere comprising ammonia gas and a hydrocarbon gas such as methane, ethane, propane and the like at a temperature of from about 1400° F. to 1700° F. The depth of the case produced will depend largely on the period of time the member is subjected to the above conditions.

The gaseous atmosphere employed in carbonitriding will usually comprise a relatively unstable carburizing gas such as methane, and anhydrous ammonia gas in suitable dilution with a relatively stable carrier gas so as to provide active carbon and active nitrogen at the surface of the member to be treated and at a controlled rate so as to avoid excessive sooting. The carrier gas is also used to purge the carbonitriding furnace of air before admitting the carburizing gas and ammonia gas and further to maintain the desired pressure within the furnace.

Various suitable carrier gases are known in the art. A carrier gas highly suitable for the invention is that partly combusted gas mixture known by the proprietary name Endogas. This gas mixture is prepared by applying external heat to a mixture of natural gas and air. The resulting reaction (an endothermic process) produces a gas which consists essentially of nitrogen, carbon monoxide and hydrogen with possibly small amounts of carbon dioxide and water vapor being present. This gas is well known in the art as a suitable atmosphere for the controlled-atmosphere electric furnaces employed in the heat treatment of metals. In preparing the partly combusted gas the ratio by volume of air to gas used is usually from about 2:1 to 3:1.

The carrier gas is first fed to the furnace to purge the furnace of air and in an amount sufficient to attain the desired pressure within the furnace. Ammonia gas and methane are then introduced into the furnace along with the carrier gas in amounts sufficient to maintain in the furnace from about 8% to 11% by volume of ammonia and from about 3% to 5% by volume of methane.

It has been determined that the desired case depth can be attained on the pole faces of the magnetic core members by placing the members in a suitable furnace provided with the desired carbonitriding atmosphere maintained at a temperature of from about 1525° F. to 1575° F. for a period of time of from about 10 minutes to 75 minutes.

The members are then removed from the furnace and quenched. A water quench can be employed, however, it is preferred to quench the members in an oil bath maintained at a temperature of from about 150° F. to 200° F. since warping is less liable to occur with an oil quench. The members may be annealed, if desired, after quenching. The relatively slow quench obtained in heated oil can be successfully employed owing to the fact that the critical cooling rate of the ferrous components has been lowered as compared to carburized steel by the absorption of nitrogen in the case. It has been discovered that the slow quench as produced by this invention is highly desirable since it does not adversely affect the magnetic properties of the carbonitrided members and the members do not become distorted to any substantial degree. The pole faces of the magnetic core members remain substantially parallel to one another, and very little, if any grinding of the pole faces is necessary to correct for any slight distortion that may occur.

As previously set forth, it has been discovered that these carbonitrided members can be further treated with a suitable light mineral oil to further increase the life of the electromagnetically actuated device in which they are employed. It is to be understood that the application of the oil can be made to members that have not been subjected to the carbonitriding treatment and thereby increase the life of the electromagnetically actuated device thus treated.

After oil quenching the magnetic core members are thoroughly cleaned to remove any adhering quench oil. A light petroleum or mineral oil is then applied in a manner hereinafter set forth. It is also possible to satisfactorily apply this hydrocarbon oil by employing it as the quenching medium, and thereby eliminate the step of removing the quenching oil.

The type of oil employed in this invention is important. The viscosity of the oil should be high enough so that it will adhere to the surface of the contacting faces and low enough so that only an extremely thin film of the oil will be present on the surface. Furthermore, the applied thin oil film should not pick up foreign material such as airborne dust and the like. Such pickup of foreign material will produce a sticky adhesive film on the contacting faces which will cause the contacting faces to stick together during operation and thereby prevent effective operation of the device.

It has been found that highly suitable oils for use in this invention are refined mineral oils obtained from the fractional distillation of crude oil. In the fractional distillation of crude oil, that fraction is preferred which has a viscosity of from about 10 to 100 seconds at 100° F. when measured by a Saybolt viscometer. This fraction has a boiling range of between about 150° F. and 600° F. at a pressure of two millimeters of mercury and may be composed chiefly of paraffin or naphthene hydrocarbons or both. Various amounts of unsaturated aliphatic compounds and aromatic hydrocarbons will be present depending upon the composition of the crude oil from which the fraction was obtained.

To insure a thin film of the mineral oil on the contacting faces of the magnetic core members it is desirable to saturate the magnetic core members with the oil. This is conveniently accomplished by placing the magnetic core members into a container of the mineral oil either at room temperature or heated to about 200° C., hot oil being ordinarily preferred, for a few minutes and then removing the magnetic core members from the container and allowing excess oil to drain therefrom. After this treatment, oil will be present on the pole faces and in the interlaminar spaces and will be retained on the insulation on the laminations in sufficient amounts to stabilize the small quantity in the film on the pole faces.

Application of the mineral oil only to the contacting faces of the magnetic core member is not satisfactory. Owing to the fact that the surfaces of the laminations comprising the magnetic core member are provided with a somewhat porous coating of insulation, some of the oil applied to the pole face surfaces will be bled from the surface resulting in a deficiency of oil on the pole face surfaces for the purpose of this invention.

The following examples are given to illustrate the advantages of this invention. Armature members and magnetic core members are prepared from laminations of magnetic sheet material comprising an alloy consisting essentially of .03% carbon, 0.36% aluminum, .12% manganese, .007% phosphorus, .015% sulfur, 3.39% silicon and the balance iron. The members are thoroughly degreased and cleaned.

*Example I*

Two of the armature members and two of the magnetic core members are placed in a furnace maintained at about 1550° F. and containing a carbonitriding atmosphere comprising, by volume, about 5 parts of methane gas, about 12 parts of anhydrous ammonia gas and about 83 parts of Endogas.

One armature member and one magnetic core member are left in the furnace for about 30 minutes and the other two members for 50 minutes. The members are quenched in an oil bath maintained at about 175° F. after removal from the furnace. All quench oil is removed from the members after quenching.

The two armature members and the two magnetic core members are assembled in magnetic actuators similar to that shown in FIG. 1 of the drawing. Both devices have an air gap of about .018 inch. The data obtained from 35 million operations of the device which comprises the members subjected to the carbonitriding treatment for 50 minutes are shown in curve A of FIG. 2 of the drawing. Curve B shows data obtained after 31 million operations of the other device which comprises the members that are subjected to the carbonitriding treatment for 30 minutes.

For comparison, an untreated armature member and magnetic core member identical with the treated armature members, are also assembled into a magnetic actuator of identical construction. Curve C of FIG. 2 of the drawing shows that the air gap, which was originally about .018 inch, went to zero after only 14 million operations.

*Example II*

One armature member and one magnetic core member made of laminations of the alloy of Example I are placed in a furnace maintained at about 1550° F. and containing a carbonitriding atmosphere comprising, by volume, about 5 parts of methane gas, about 12 parts of anhydrous ammonia gas and about 83 parts of Endogas gas atmosphere. The members are left in the furnace for about 40 minutes. The members are quenched in an oil bath maintained at about 175° F. after removal from the furnace. The oil employed in the quenching operation is a light mineral oil of the type hereinbefore described and having a viscosity within the range set forth. The members are removed from the quenching medium and the excess oil drained therefrom.

These members are assembled in magnetic actuators as in Example I and with an air gap of about .018 inch. Curve D of FIG. 3 of the drawing shows data obtained from 35 million operations of the magnetic actuator.

*Example III*

One armature member and one magnetic core member are placed in the heated oil bath of Example II for about 5 minutes. They are removed and the excess oil drained therefrom. The members are assembled in magnetic actuators as in Example I and with an air gap of about .019 inch. Curve E of FIG. 3 of the drawing shows that after 22 million operations of the device the air gap went to zero.

An untreated armature member and an untreated magnetic core member are assembled into a magnetic actuator of identical construction as those of Examples II and III. To illustrate the importance of applying the mineral oil so that its present in the interlaminar spaces as well as on the pole face surfaces, a thin film of oil of the same type employed in Example II was applied only to the pole face surfaces. Curve F of FIG. 3 of the drawing shows that the air gap, which was originally about .019 inch, went to zero after only 14 million operations.

The film of mineral oil that is provided on the surfaces of the pole faces is microscopically thin and is present as such on the pole face surfaces only during the initial period of operation of the magnetic actuator. During the initial period of operation of the magnetic actuator, the mineral oil is oxidized and there is provided on the pole face surfaces a microscopically thin coating of oxidized oil, referred to as "varnish." It is this thin oxidized oil coating which is derived from a very thin coating of the mineral oil that provides the unusual degree of pole face wear resistance whereby the number of satisfactory contacting operations of the magnetic actuator is increased.

Oil films of proper viscosity and proper thickness for the purpose of this invention will be dry to the touch and are barely visible to the eye. Applied oil films that are tacky when touched with the finger are unsatisfactory. The tacky condition indicates the presence of too much oil and/or the use of too viscous an oil. Too much oil or too viscous an oil will not produce the desired thin oxidized oil coating on the pole face surfaces. Thus layers of grease or petroleum, even when wiped off, result in great wear of the pole faces. It has been found that when quantities of oil sufficient to produce a heavy, tacky layer, are present on the pole faces, wear occurs at a high rate during operation of the magnetic actuator. Therefore, this invention is contrary to the expectation that presence of large amounts of oil will reduce wear rates.

The presence of small amounts of oil in the oxide insulation on the laminations cooperates to maintain the oil film on the pole faces at optimum thickness. Thus if paper is employed between the laminations it will carry a great excess of oil which is fed to the pole faces during operation of the magnetic actuators embodying such paper and undesirable increase in wear rate occurs.

While it is not possible to measure the thickness of mineral oil films of satisfactory thickness, a practical test has been devised whereby those skilled in the art can easily and readily determine whether or not the applied oil film is satisfactory. This test will be obvious from the discussion that follows.

It has been determined that after a number of operations of the order of from about 200,000 to 500,000, of the magnetic actuator the pole face surfaces provided with the desired oil film will take on a visible dark glazed appearance. The appearance of this visible glaze on the pole face surface during this initial short period of operation of the magnetic actuator indicates that the applied oil film has oxidized satisfactorily and that the desired wear resistant varnish coating has been produced on the pole face surfaces. If this visible glaze does not appear on the surfaces of the pole face within about the first 500,000 operations of the magnetic actuator the applied oil film is not satisfactory and accelerated wear will result.

While this invention has been detailed with respect to magnetic actuators comprising core members comprising E-punchings having a center pole with an air gap which air gap will vary depending on pole face wear, there are other types of magnetic actuators comprising core members of different configuration providing different air gap designs, for example, in the leg of the core itself, such that the air gap is not dependent on pole face wear. Nevertheless, pole face wear is also objectionable in magnetic actuators of these latter types and it is to be understood that this invention is also applicable to such magnetic actuators.

The thin film of mineral oil on the pole face surfaces and the resulting thin varnish coating which is subsequently produced also protect the pole faces from rusting. Rusting of the pole face surfaces adversely affects the proper functioning of the magnetic actuator and also causes the introduction of objectionable noises into the device.

While the exact chemical compositon of the film of oxidized oil is not known and the mechanism of its formation not fully understood, it is believed that the oil film oxidizes under the influence of the pressure and the heat generated by the contacting operation and there is produced a hard varnish film on the surfaces of the contacting or pole faces. It is to be understood that it is not intended to limit the invention by this explanation. The explanation is given only for the purpose of assisting in understanding the invention.

It is to be understood that the description and drawing are exemplary and not in limitation of the invention.

We claim as our invention:

1. In a magnetic actuator comprising relatively movable magnetic core members having faces adapted to come into contact with each other and an air gap between other faces, the magnetic core members comprising an iron base magnetic material, the contacting faces of said magnetic core members comprising a carbonitrided case at least one mil thick and a relatively thin adherent film of mineral oil on the surface thereof whereby the faces will withstand a considerably greater number of contacting operations without substantial change of air gap between the said other faces.

2. In a magnetic actuator comprising relatively movable magnetic core members having faces adapted to come into contact with each other and an air gap between other faces, the magetic core members comprising an iron base magnetic material, the contacting faces of said magnetic core members having only a relatively thin adherent drip-free film of mineral oil on the surfaces thereof whereby the faces will withstand a considerably greater number of contacting operations without substantial change of air gap between the said other faces.

3. In a magnetic actuator comprising relatively movable magnetic core members having faces adapted to come into contact with each other and an air gap between other faces, the magnetic core members comprising an iron base magnetic material, the contacting faces of said magnetic core members comprising a carbonitrided case at least one mil thick, whereby the contacting faces will withstand a considerably greater number of contacting operations without substantial change of air gap between the said other faces, the said carbonitrided case being produced by case hardening the contacting faces of said magnetic core members in an atmosphere comprising a carburizing gas and ammonia at a temperature of from about 1400° F. to 1700° F. for a period of time of from about 10 minutes to 75 minutes.

4. In a magnetic actuator comprising relatively movable magnetic core members having faces adapted to come into contact with each other and an air gap between other faces, the magnetic core members comprising laminations of magnetic sheet material comprising an alloy of from 0.5% to 7% of silicon, up to 2% of aluminum, and the balance iron except for minor components and incidental impurities, the contacting faces of said magnetic core members comprising a carbonitrided case at least one mil thick and a relatively thin adherent film of mineral oil on the surface thereof whereby the faces will withstand a considerably greater number of contacting operations without substantial change of air gap between the said other faces.

5. In a magnetic actuator comprising relatively movable magnetic core members having faces adapted to come into contact with each other and an air gap between other faces, the magnetic core members comprising laminations of magnetic sheet material comprising an alloy of from 0.5% to 7% of silicon, up to 2% of aluminum, and the balance iron except for minor components and incidental impurities and a layer of relatively porous insulation on the surfaces of the laminations, a thin coating of mineral oil applied to the magnetic core members only in an amount that is retained by the porous insulation, the contacting faces of said magnetic core members having only a relatively thin adherent drip-free film of mineral oil on the surfaces thereof whereby the faces will withstand a considerably greater number of contacting operations without substantial change of air gap between the said other faces.

6. In a magnetic actuator comprising relatively movable magnetic core members having faces adapted to come into contact with each other and an air gap between other faces, the magnetic core members comprising an alloy of from 0.5% to 7% of silicon, up to 2% of aluminum, and the balance iron except for minor components and incidental impurities, the contacting faces of said magnetic core members having only a relatively thin adherent drip-free film of mineral oil on the surfaces thereof whereby the faces will withstand a considerably greater number of contacting operations without substantial change of air gap between the said other faces, the said mineral oil being derived by the fractional distillation of crude oil and being that fraction having a viscosity of from about 10 to 100 seconds at 100° F. when measured by a Saybolt viscometer.

7. The method of providing a wear resistant surface on the contacting faces of a magnetic core member comprising laminations of magnetic sheet material comprising an alloy of from 0.5% to 7% of silicon, up to 2% of aluminum, and the balance iron except for minor components and incidental impurities, the steps which comprise subjecting the magnetic core member to an atmosphere comprising a carburizing gas and ammonia at a temperature of from about 1400° F. to 1700° F. for a period of time of from about 10 minutes to 75 minutes to provide a carbonitrided case at least one mil thick on the contacting faces, quenching the member in a mineral oil bath maintained at a temperature of from about 150° F. to 200° F., the said mineral oil being derived by the fractional distillation of crude oil and being that fraction having a viscosity of from about 10 to 100 seconds at 100° F. when measured by a Saybolt viscometer, removing the member from the oil bath, and permitting the excess mineral oil to drain from the member.

8. The method of providing a wear resistant surface on the contacting faces of a magnetic core member comprising laminations of magnetic sheet material comprising an alloy of from 0.5% to 7% of silicon, up to 2% of aluminum, and the balance iron except for minor components and incidental impurities, the steps which comprise subjecting the magnetic core member to an oxidizing atmosphere at a temperature of from about 750° F. to 1060° F. for a period of time of from about 1 hour to 6 hours to provide thereon a thin oxide film, machining the surfaces of the contacting faces to remove the oxide film therefrom, subjecting the thus treated magnetic core member to an atmosphere comprising a carburizing gas and ammonia at a temperature of from about 1400° F. to 1700° F. for a period of time of from about 10 minutes to 75 minutes to provide a carbonitrided case at least one mil thick on the contacting faces, quenching the member in a mineral oil bath maintained at a temperature of from about 150° F. to 200° F., the said mineral oil being derived by the fractional distillation of crude oil and being that of fraction having a viscosity of from about 10 to 100 seconds at 100° F. when measured by a Saybolt viscometer, removing the member from the oil bath, and permitting the excess mineral oil to drain from the member.

9. In a magnetic actuator comprising relatively movable magnetic core members having faces adapted to come into contact with each other and which faces being subject to wear, the magnetic core member comprising an iron base magnetic material, the contacting faces of said magnetic core members comprising a carbonitrided case at least one mil thick and a relatively thin adherent film of mineral oil on the surface thereof whereby the faces will withstand a considerably greater number of contacting operations without substantial wear.

10. In a magnetic actuator comprising relatively movable magnetic core members having faces adapted to come into contact with each other and which faces being subject to wear, the magnetic core members comprising an iron base magnetic material, the contacting faces of said magnetic core members having only a relatively thin adherent drip-free film of mineral oil on the surfaces thereof whereby the faces will withstand a considerably greater number of contacting operations without substantial wear.

11. In a magnetic actuator comprising relatively movable magnetic core members having faces adapted to come into contact with each other and which faces being subject to wear, the magnetic core members comprising an iron base magnetic material, the contacting faces of said magnetic core members comprising a carbonitrided case at least one mil thick, whereby the contacting faces will withstand a considerably greater number of contacting operations without substantial wear, the said carbonitrided case being produced by case hardening the contacting faces of said magnetic core members in an atmosphere comprising a carburizing gas and ammonia at a temperature of from about 1400° F. to 1700° F. for a period of time of from about 10 minutes to 75 minutes.

References Cited in the file of this patent

UNITED STATES PATENTS

| | | |
|---|---|---|
| 2,458,655 | Sowa | Jan. 11, 1949 |
| 2,472,320 | Vennerholm et al. | June 7, 1949 |
| 2,538,036 | Ponstingl | Jan. 16, 1951 |
| 2,544,491 | Davis | Mar. 6, 1951 |
| 2,561,991 | Ponstingl | July 24, 1951 |